United States Patent
Ren

(10) Patent No.: US 9,596,710 B2
(45) Date of Patent: Mar. 14, 2017

(54) INFORMATION PROCESSING METHOD AND ELECTRONIC DEVICE

(71) Applicant: Lenovo (Beijing) Co., Ltd., Beijing (CN)

(72) Inventor: Fei Ren, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/639,458

(22) Filed: Mar. 5, 2015

(65) Prior Publication Data

US 2016/0080382 A1 Mar. 17, 2016

(30) Foreign Application Priority Data

Sep. 15, 2014 (CN) .......................... 2014 1 0468922

(51) Int. Cl.
*H04W 76/02* (2009.01)
*H04L 29/06* (2006.01)
*H04L 29/08* (2006.01)

(52) U.S. Cl.
CPC ....... *H04W 76/023* (2013.01); *H04L 63/1416* (2013.01); *H04L 63/1483* (2013.01); *H04L 63/18* (2013.01); *H04L 67/02* (2013.01)

(58) Field of Classification Search
CPC ....... H04W 4/12; H04W 12/06; H04W 12/12; H04L 63/18; H04L 63/1416
USPC .... 455/410, 411, 412.1, 412.2, 466; 726/22, 726/26
See application file for complete search history.

(56) References Cited

U.S. PATENT DOCUMENTS

| 8,578,166 | B2 | 11/2013 | De Monseignat |
| 8,677,481 | B1 * | 3/2014 | Lee ........................ H04L 63/168 726/22 |
| 2006/0168480 | A1 * | 7/2006 | Chandler ............ G06F 9/44589 714/38.1 |

FOREIGN PATENT DOCUMENTS

CN 101816148 8/2010

OTHER PUBLICATIONS

First Office Action dated Sep. 26, 2016 (8 pages including English translation) out of Chinese priority Application No. 201410468922.5.

* cited by examiner

*Primary Examiner* — Sam Bhattacharya
(74) *Attorney, Agent, or Firm* — Brinks Gilson & Lione; G. Peter Nichols

(57) ABSTRACT

An information processing method is described that is applied to an electronic device capable of running an application. The method includes inserting a first execution module into a target process of the application for triggering a detection for network connection safety; the first execution module acquiring a first network connection from the target process and invoking a second execution module; the second execution module validating safety of the first network connection and feeding back a second network connection, the second network connection is a safe connection corresponding to the same content as the first network connection; the target process acquiring the second network connection. An electronic device corresponding thereto is also disclosed.

11 Claims, 4 Drawing Sheets

INFORMATION PROCESSING METHOD AND ELECTRONIC DEVICE

This application claims priority to Chinese patent application No. 201410468922.5 filed on Sep. 15, 2014 the entire contents of which are incorporated herein by reference.

BACKGROUND

The present disclosure relates to the field of electronic technology, and particularly to an information processing method and an electronic device.

With a development of Internet technology and an increasing population of electronic devices such as a cell phone, a computer, a tablet, or the like, the life style of the human being has been changed a lot.

In the related art, there are more and more applications for surfing on Internet in the electronic device, such as the browser, the chat software, the game software or the like. Such software is applied widely in the human life. For example, if a user wants to open a webpage through the browser, the browser will transmit a link request for the webpage to a server side when the user opens the webpage. After the server side receives the link request transmitted from the browser, the user can open the corresponding webpage.

The inventors of the present application have found at least the following technical problems in the related art when implementing the technical solutions of the embodiments of the present disclosure.

In the related art, when it is required to open the webpage through the browser, the browser will transmit a link request for the webpage to the server side. However, in practice, the link request may not be safe. There may be the malicious code, the virus, the Trojan or the like. The system of the cell phone may be attacked, resulting in that the system is broken down or even cannot run.

It can be seen that there is a technical problem of a poor safety when the electronic device is networked in the related art.

Due to the above technical problem, the electronic device cannot link to a desired webpage in time, and may be attacked by the malicious code, the virus or the Trojan, resulting in that the system of the cell phone is broken down, which bothers the user a lot. Therefore, the electronic device in the related art has a problem of a poor user experience.

SUMMARY

An information processing method is provided in an embodiment of the present disclosure, which is applied to an electronic device capable of running an application, the method including: inserting a first execution module into a target process corresponding to the application, for triggering a detection for network connection safety; the first execution module acquiring a first network connection from the target process; the first execution module invoking a second execution module; the second execution module validating safety of the first network connection and feeding back a second network connection, the second network connection is a safe connection corresponding to the same content as the first network connection; and the target process acquiring the second network connection.

Optionally, the method further includes: storing a running state of the target process in a register of the electronic device, before inserting the first execution module into the target process; and the target process reading out the running state from the register after acquiring the second network connection from the register.

Optionally, the method further includes: setting the second execution module before the first execution acquiring the first network connection from the target process, so that the second execution module operatively responding to the invoking of the first execution module by replacing a third execution module, the third execution module is an original invoked module of the first execution module.

Optionally, the second execution module validating the safety of the first network connection and feeding back the second network connection includes: determining whether the first network connection is a safe connection and obtaining a determination result; feeding back the first network connection to act as the second network connection if the determination result indicates that the first network connection is a safe connection; feeding back a third network connection to act as the second network connection if the determination result indicates that the first network connection is not a safe connection, the third network connection is a safe connection corresponding to the same content as the first network connection.

Optionally, the method further includes: generating and outputting prompt information by the second execution module if the determination result indicates that the first network connection is not the safe connection, the prompt information indicates that the first network connection is not safe.

In another aspect, an electronic device capable of running an application is provided in an embodiment of the present disclosure, the electronic device includes: an inserting module operative to insert a first execution module into a target process corresponding to the application, for triggering a detection for network connection safety; the first execution module is operative to acquire a first network connection from the target process, and to invoke a second execution module; the second execution module is operative to validate a safety of the first network connection and to feed back a second network connection, the second network connection is a safe connection corresponding to the same content as the first network connection; and a process management module operative to control the target process to acquire the second network connection.

Optionally, the electronic device further comprises a register; a storage module operative to store a running state of the target process in the register; and the process management module is further operative to control the target process to read out the running state from the register after acquiring the second network connection.

Optionally, the electronic device further includes: a setting module operative to set the second execution module before the first execution module acquiring the first network connection from the target process, and to control the second execution module to respond to the invoking of the first execution module by replacing a third execution module, the third execution module is an original invoked module of the first execution module.

Optionally, the second execution module is further operative to: determine whether the first network connection is a safe connection and obtain a determination result; feedback the first network connection to act as the second network connection, if the determination result indicates that the first network connection is a safe connection; and feedback a third network connection to act as the second network connection, if the determination result indicates that the first network connection is not a safe connection, the third network connection is a safe connection corresponding to the same content as the first network connection.

Optionally, the second execution module is further operative to generate and output prompt information if the determination result indicates that the first network connection is not a safe connection, the prompt information indicating that the first network connection is not safe.

In still another aspect, a computer readable storage medium is provided in an embodiment of the present disclosure, which has stored therein computer program instructions which, when being executed by a processor of an electronic device, performs any one of the above method.

BRIEF DESCRIPTION OF THE DRAWINGS

In order to describe the embodiments of the present disclosure or the technical solutions in the related art more clearly, hereinafter, the accompany drawings necessary to be used in the description of the embodiments will be introduced briefly. Apparently, the accompany drawings in the following description are only some embodiments of the present disclosure.

DETAILED DESCRIPTION

An information processing method and an electronic device are provided in embodiments of the present disclosure, in order to solve the technical problem of the poor safety when the electronic device is networked, so as to achieve the technical effect of improving the networking safety of the electronic device.

In order to solve the above technical problem, the general idea of the technical solution in the embodiments of the present disclosure is as follows.

A first execution module for triggering a detection for network connection safety is inserted into a target process corresponding to the application, when the application is running.

A first network connection is acquired from the target process by the first execution module, when the first execution module is in a running procedure.

A second execution module is invoked by the first execution module.

A safety of the first network connection is validated and a second network connection is fed back by the second execution module, wherein the second network connection is a safe connection, and the first network connection and the second network connection correspond to the same content.

The second network connection is acquired by the target process.

In the above technical solution, since the technical solution in the embodiment of the present disclosure uses the second execution module different from the first execution module to validate the safety of the first network connection and to feed back the second network connection which is a safe connection, and the first network connection and the second network connection correspond to the same content, the following problem will not occur. That is, in the related art, the sever wouldn't replace the unsafe first network connection with a safe network connection when the first network connection transmitted by the electronic device is not safe, which results in that the system of the cell phone is attacked, broken down or even cannot run. Therefore, with the technical solution of the present disclosure, the attack to the system of the cell phone may be avoided, and the technical problem of the poor safety when the electronic device is networked in the related art can be solved effectively, and the technical effect of improving the safety of the networking of the electronic device is realized.

In order to make the above technical solution better understood, the technical solution of the present disclosure will be described in detail by the accompany drawings and the detailed embodiments. It should understand that the embodiments and the specific features in the embodiments of the present disclosure are detailed description of the technical solution of the present disclosure, but not a limitation to the technical solution of the present disclosure. The embodiments and the technical features in the embodiments of the present disclosure may be combined with each other without confliction.

First Embodiment

Figure 1:
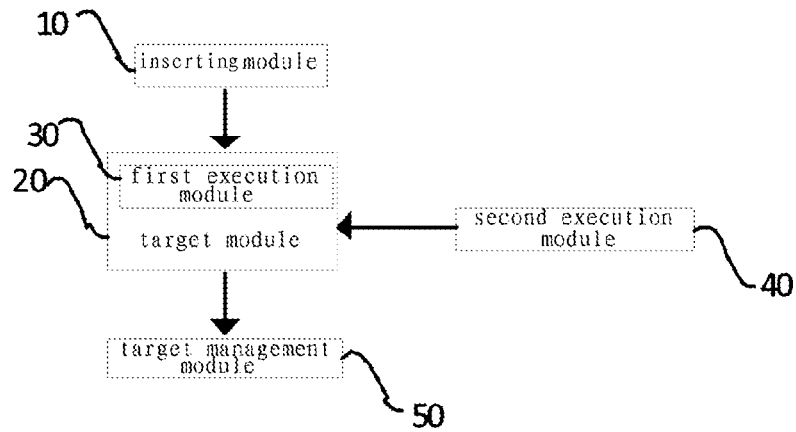
FIG. 1 is an electronic device provided in an embodiment of the present disclosure.

An information processing method is provided in an embodiment of the present disclosure, which is applied to an electronic device capable of running an application. Referring to FIG. 1, the electronic device in the embodiment of the present disclosure can run the application, and comprises an inserting module 10 operative to insert a first execution module 30 for triggering a detection for network connection safety into a target process 20 corresponding to the application, when the application is running; the first execution module 30 operative to acquire a first network connection from the target process 20, when the first execution module 30 is in a running procedure; the first execution module 30 further operative to invoke a second execution module 40; the second execution module 40 operative to validate a safety of the first network connection and to feed back a second network connection, wherein the second network connection is a safe connection, and the first network connection and the second network connection correspond to the same content; and a process management module 50 operative to control the target process 20 to acquire the second network connection.

In the embodiment of the present disclosure, the electronic device may be a cell phone terminal, a notebook computer or a tablet computer. The application may be a browser, an application of game software, an application of chat software, or other applications which will not listed here in detail.

Figure 2:
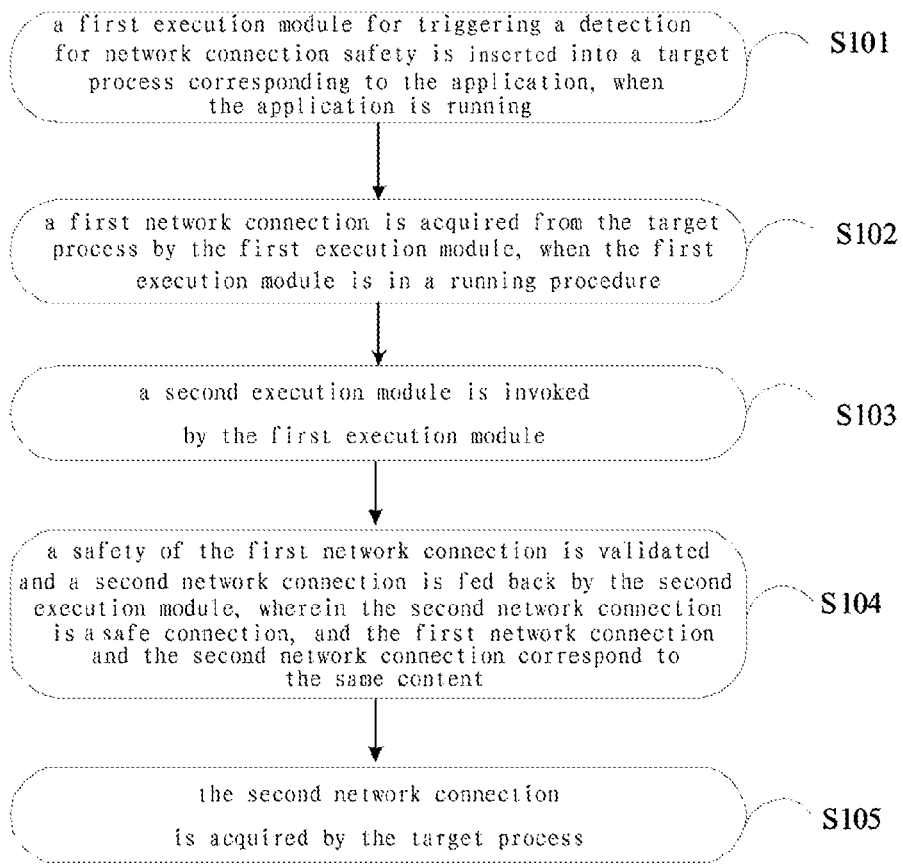
FIG. 2 is a schematic flowchart of an information processing method provided in an embodiment of the present disclosure.

Hereinafter, the implementation procedure of the method in the embodiment of the present disclosure will be described in detail with reference to FIG. 2. The method comprises the following steps.

In a step S101, a first execution module 30 for triggering a detection for network connection safety is inserted into a target process 20 corresponding to the application, when the application is running.

In a step S102, a first network connection is acquired from the target process 20 by the first execution module 30, when the first execution module 30 is in a running procedure.

In a step S103, a second execution module 40 is invoked by the first execution module 30.

In a step S104, a safety of the first network connection is validated and a second network connection is fed back by the second execution module 40, wherein the second network connection is a safe connection, and the first network connection and the second network connection correspond to the same content.

In a step S105, the second network connection is acquired by the target process 20.

Figure 3:
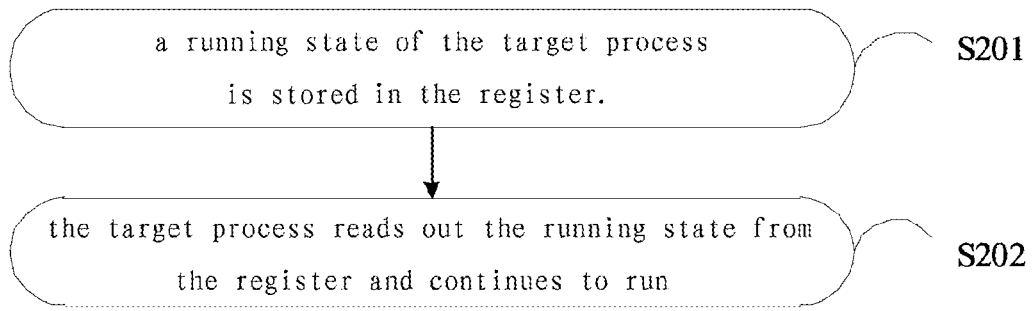
FIG. 3 is a schematic flowchart before a step S101 is performed provided in an embodiment of the present disclosure.

In order to ensure that the target process 20 can run normally after the target process 20 is inserted with the first execution module 30, a step S201 is included before the step S101 is performed. Hereinafter, the implementation procedure of the method in the embodiment of the present disclosure will be described with reference to FIG. 3 in detail. The method further comprises the following step.

In the step S201, a running state of the target process 20 is stored in the register.

Accordingly, the method further comprises a step S202, in which the target process 20 reads out the running state from the register and continues to run, after the target process 20 acquires the second network connection.

In the specific implementation, when the electronic device is the cell phone terminal and the application running on the electronic device is a browser application, the implementation of the step S101 is as follows.

When a browser is required to be started, the shortcut of the browser on the terminal is clicked first. At this time, the run application of the browser will transmit the first network connection to the server side. In order to determine the safety of the first network connection before the server side responds to the first network connection, the first execution module 30 capable of acquiring the first network connection needs to be inserted into the target process 20. However, in order for the target process 20 to run normally after inserting with the first execution module 30 and running the first execution module 30, the running state of the target process 20 needs to be stored in the register first before the first execution module 30 is inserted into the target process 20. In the embodiment of the present disclosure, the server is arranged at the network side, which may be a notebook computer, a personal computer or the like. The register may be an instruction register for storing instructions being executed or an application timer for storing address of a unit where the next instruction is located. Then, the process of inserting with the first execution module 30 capable of acquiring the first link request is as follows.

Find_Proccess(system, target_process_pid);
struct StoreRegister StoreR;
strcpy(&StoreR,CurrentRegister);
pthread_safe_thread;
pthread_create(&safe_thread, NULL, thread_handle, NULL);

After the target process 20 is inserted with the first execution module 30 and before performing the step S102, the following step is performed. The second execution module 40 is set, and the invoked of the first execution module 30 is responded by replacing a third execution module by the second execution module 40, wherein the third execution module is an original invoked module of the first execution module 30. After performing the above step, the step S102 is performed. That is, the first network connection is acquired from the target process 20 by the first execution module 30, when the first execution module 30 is in the running procedure.

After the first network connection is obtained after performing the step S102, the step S103 is performed, in which a second execution module 40 is invoked by the first execution module 30. In the embodiment of the present disclosure, the second execution module 40 may be inserted into the target process 20 like the first execution module 30. Alternatively, it may not be inserted into the target process 20 like the first execution module 30, but is invoked by the first execution module 30 when the first execution module 30 is performed, so as to complete the determination of the safety of the first network connection.

After performing the step S103, a step S104 is performed in which the safety of the first network connection is validated and a second network connection is fed back by the second execution module 40, wherein the second network connection is a safe connection and the first network connection and the second network connection correspond to the same content.

Figure 4:
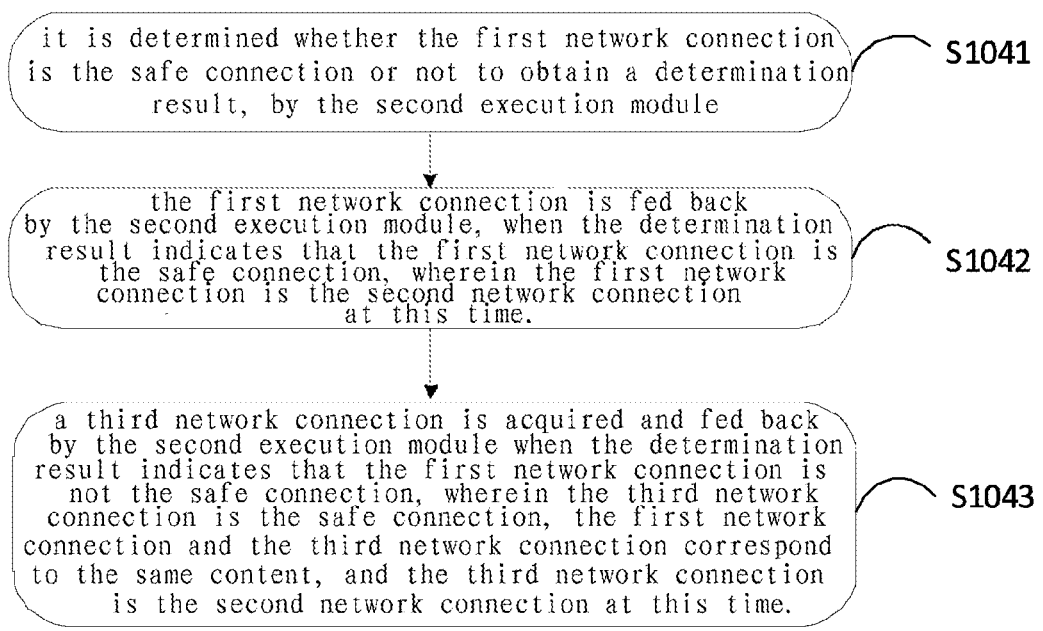
FIG. 4 is a schematic flowchart of a detailed implementation of a step S104 provided in an embodiment of the present disclosure.
Figure 5:
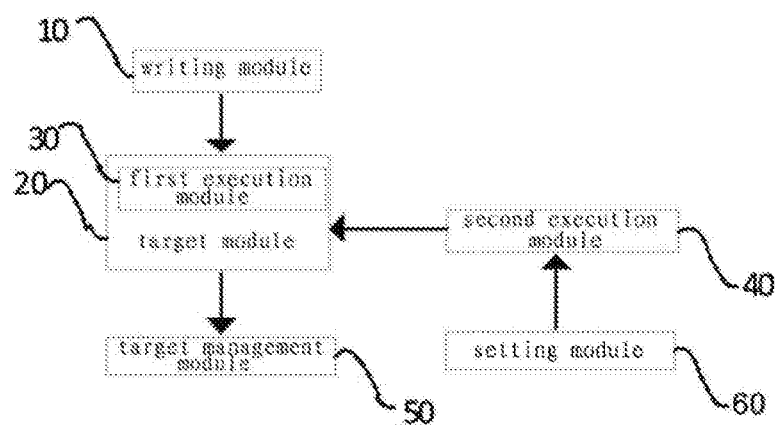
FIG. 5 is an electronic device provided in another embodiment of the present disclosure.
Figure 6:
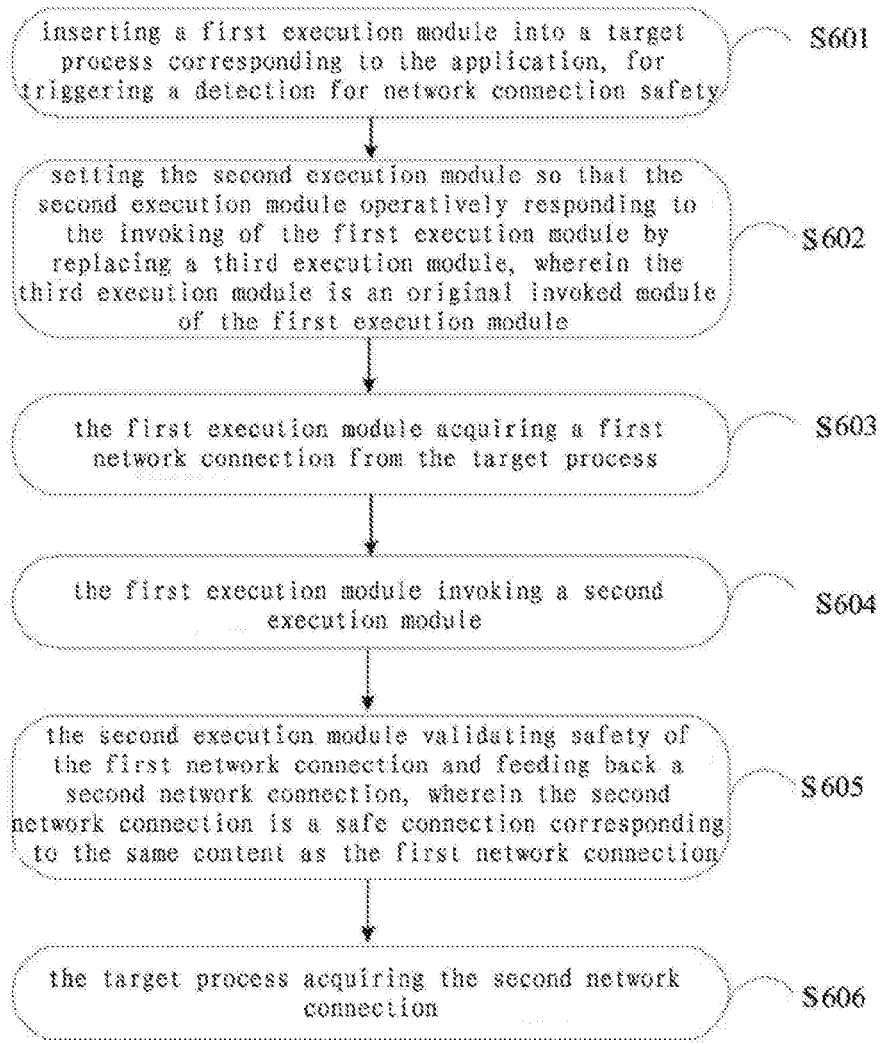
FIG. 6 is a schematic flowchart of an information processing method provided in another embodiment of the present disclosure.
Figure 7:
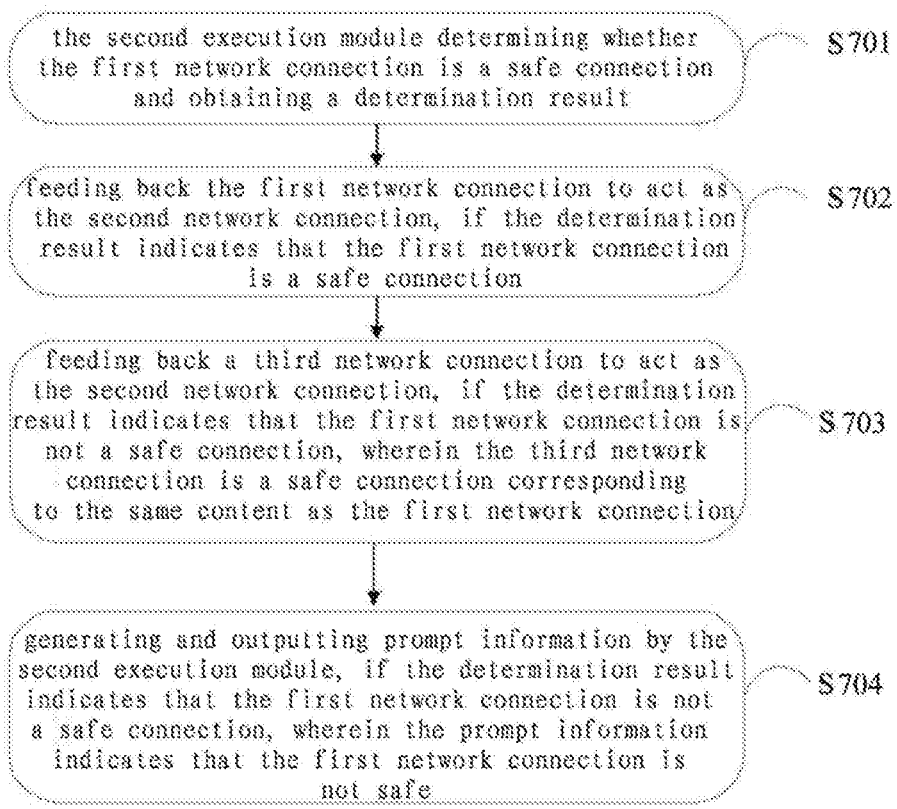
FIG. 7 is a schematic flowchart of an information processing method provided in another embodiment of the present disclosure.

Referring to FIG. 4, the step S104 comprises the following processes in detail.

The validation of a safety of the first network connection and the feedback of a second network connection by the second execution module 40 different from the first execution module 30 comprises the following steps in detail.

In a step S1041, it is determined whether the first network connection is the safe connection or not to obtain a determination result, by the second execution module 40.

In a step S1042, the first network connection is fed back by the second execution module 40, when the determination result indicates that the first network connection is the safe connection, wherein the first network connection is acting as the second network connection at this time.

In a step S1043, a third network connection is acquired and fed back by the second execution module 40 when the determination result indicates that the first network connection is not the safe connection, wherein the third network connection is the safe connection, the first network connection and the third network connection correspond to the same content, and the third network connection is acting as the second network connection at this time.

After performing the step S1041 in which it is determined whether the first network connection is the safe connection or not to obtain a determination result by the second execution module 40, the method further comprises the following step.

Prompt information is generated and output by the second execution module 40 when the determination result indicates that the first network connection is not the safe connection, the prompt information indicating that the first network connection is not the safe connection.

In the embodiment of the present disclosure, the second execution module 40 is to be run. Since the pointer invoked by the first execution module 30 originally points to the third execution module which is the original invoked module of the first execution module 30, firstly, the location which is originally pointed to by the pointer invoked by the first execution module 30 needs to be found out. Then, the pointed is modified to point to the second execution module 40, so that the second execution module 40 can be executed. The first network connection may be http://baike.baidu.com/view/178145.htm, or http://www.ifeng.com/, or other network connections which will not be listed here in detail. The first network connection may be a safe network connection or not a safe network connection. The specific implementation of the first execution module 30 is as follows.

```
char *thread_handle( )
{
    void *phttp.getHost = find(Android_Java_Vm,http.getHost);
    Replace_http_getHost( );
    native http.getHost( );
    phttp.getHost = Replace_http_getHost;
    char *pAdress =
Excute_Func(Android_Java_Vm,Replace_http_getHost);
```

After the first execution module 30 obtains the first network connection, the first execution module 30 invokes the second execution module 40 to determine the safety of the first network connection. The first network connection is fed back to the target process 20, when the determination result is yes indicating that the first network connection is the safe connection. When the determination result is no indicating that the first network connection is not the safe connection, for example there may be the malicious code, the virus, the Trojan, or other unsafe factors which are not listed here, at this time, it is necessary to replace the first network connection with a safe network connection, i.e., the third network connection, wherein the third network connection is stored in the local database and is a safe network connection corresponding to the first network connection.

In the embodiment of the present disclosure, when there is no safe network connection corresponding to the first network connection in the local database, it is necessary to download a new safe network connection from the server side to update the local database. When there is no safe network connection corresponding to the first network connection in the local database and the corresponding safe network connection cannot be downloaded from the server side, the second execution module 40 generates and outputs the prompt information. For example, the user is prompted by information such as, 'the webpage to be opened is not a safe webpage in which there may be the Trojan, the virus or the like'. At this time, there may be prompt such as "is it OK to enter?" on the cell phone, and the user of the cell phone may decide whether to open the webpage or not himself/herself.

After performing the step S104, the step S105 is performed, in which the second network connection is acquired by the target process 20.

In the specific implementation, when the determination result indicates that the first network connection is the safe connection, the second execution module 40 feeds back the first network connection to the target process 20. When the determination result indicates that the first network connection is not safe, the second execution module 40 feeds back the third network connection to the target process 20.

After performing the step S105, the step S202 is performed, in which the target process 20 reads out the running state from the register and continues to run.

In the specific implementation, the target process 20 reads out the running state of the target process 20 from the register so that the target process 20 recovers to the running state, and opens the corresponding network address by responding to the server side. Particularly, the second execution module 40 is as follows.

```
    if (TRUE== Check_Database(pAdress) );
    {
        return pAdress;
    }
    else
    {
        return Instead(safe_pAdress,pAdress);
    }
    pthread_exit(NULL);
    }
```

Corresponding to the method in the first embodiment, a second embodiment is provided in the present disclosure.

Referring to FIG. 1, an electronic device is provided in the second embodiment of the present disclosure, which is capable of running an application. In the second embodiment of the present disclosure, the electronic device may be a cell phone terminal, a notebook computer or a tablet computer. The application may be a browser, an application of game software, an application of chat software or other applications which will not listed here. The electronic device comprises: an inserting module operative to insert a first execution module 30 for triggering a detection for network connection safety into a target process 20 corresponding to the application, when the application is running; the first execution module 30 operative to acquire a first network connection from the target process 20, when the first execution module 30 is in a running procedure; the first execution module 30 further operative to invoke a second execution module 40; the second execution module 40 operative to validate a safety of the first network connection and to feed back a second network connection, wherein the second network connection is a safe connection, and the first network connection and the second network connection correspond to the same content; and a process management module 50 operative to control the target process 20 to acquire the second network connection.

In order for the target process 20 to continue running normally after executing the first execution module 30, the electronic device comprises a storage module which stores a running state of the target process 20 in the register; and the process management module 50 controls the target process 20 to read out the running state from the register and continue to run accordingly, after the target process 20 acquires the second network connection.

In the second embodiment of the present disclosure, the register may be an instruction register for storing the instruction being executed at present, or an application timer for storing the address of the unit where the next instruction is located. The second execution module 40 may be inserted into the target process 20 like the first execution module 30, or not be inserted into the target process 20 like the first execution module 30, but is invoked by the first execution module 30 when the first execution module 30 is being executed, so as to complete the determination of the safety of the first network connection.

Therefore, in order to complete the determination of the safety of the first network connection, the electronic device further comprises a setting module operative to set the second execution module 40 and controls the second execution module 40 to replace a third execution module so as to respond to the invoked of the first execution module 30, before acquiring a first network connection from the target process 20 by the first execution module 30, wherein the third execution module is an original invoked module of the first execution module 30.

After invoking the second execution module 40, the second execution module 40 further determines whether the first network connection is the safe connection or not to obtain a determination result.

The second execution module 40 further feeds back the first network connection, when the determination result indicates that the first network connection is the safe connection, wherein the first network connection is the second network connection at this time.

The second execution module 40 further acquires and feeds back a third network connection when the determination result indicates that the first network connection is not the safe connection, wherein the third network connection is the safe connection, the first network connection and the third network connection correspond to the same content, and the third network connection is the second network connection at this time.

When there is no safe network connection corresponding to the first network connection in the local database, the second execution module 40 further generates and outputs prompt information when the determination result indicates that the first network connection is not the safe connection, the prompt information indicating that the first network connection is not the safe connection.

With one or more technical solutions in the embodiments of the present disclosure, the following one or more technical effects can be realized.

Firstly, since the technical solution in the embodiment of the present disclosure uses the second execution module different from the first execution module to validate the safety of the first network connection and to feed back the second network connection which is a safe connection, and the first network connection and the second network connection correspond to the same content, the following problem will not occur. That is, in the related art, the sever wouldn't replace the unsafe first network connection with a safe network connection when the first network connection transmitted by the electronic device is not safe, which results in that the system of the cell phone is attacked, broken down or even cannot run. Therefore, with the technical solution of the present disclosure, the attack to the system of the cell phone may be avoided, and the technical problem of the poor safety when the electronic device is networked in the related art can be solved effectively, and the technical effect of improving the safety of the networking of the electronic device is realized.

Secondly, since the technical solution in the embodiment of the present disclosure uses the second execution module different from the first execution module to validate the safety of the first network connection and to feed back the second network connection which is a safe connection, and the first network connection and the second network connection correspond to the same content, the following problem will not occur. That is, in the related art, when the first network connection transmitted by the electronic device is not safe, the user of the electronic device cannot link to the desired webpage in time, and will be attacked by the malicious code, the virus or the Trojan to make the system of the cell phone break down. Therefore, the technical effect of improving the user experience of the electronic device can be realized by the technical solution of the present disclosure.

Those skilled in the art may recognize that the embodiments of the present disclosure may be provided as the method, the device or the computer program product. Therefore, the present disclosure may adopt a form of a hardware embodiment, a software embodiment, or an embodiment combining software with hardware. Also, the present disclosure may adopt a form of one or more computer program product implemented on a computer usable storage medium, which includes, but not limited to, a magnetic storage and an optical storage or the like, embodied with computer usable program code therein.

The disclosure is described with reference to flowchart illustrations and/or block diagrams of methods, apparatus and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Particularly, the computer program instruction corresponding to the information processing method in the embodiment of the present disclosure may be stored on a storage medium such as an optical disk, a hard disk, a USB disk or the like. When the computer program instruction corresponding to the information processing method in the storage medium is read or executed by an electronic device, the following steps are performed.

A first execution module for triggering a detection for network connection safety is inserted into a target process corresponding to the application, when the application is running.

A first network connection is acquired from the target process by the first execution module, when the first execution module is in a running procedure.

A second execution module is invoked by the first execution module.

A safety of the first network connection is validated and a second network connection is fed back by the second execution module, wherein the second network connection is a safe connection, and the first network connection and the second network connection correspond to the same content.

The second network connection is acquired by the target process.

Optionally, the computer program instruction stored in the storage medium, when being executed, further makes the electronic device perform the following step.

A running state of the target process is stored in the register, before inserting a first execution module for triggering a detection for network connection safety into a target process corresponding to the application when the application is executed.

The target process reads the running state from the register and continues to run, after the target process acquires the second network connection.

Optionally, the computer program instruction stored in the storage medium, when being executed, further makes the electronic device perform the following step.

The second execution module is set and the invoked of the first execution module is responded by replacing a third execution module by the second execution module, before acquiring a first network connection from the target process by the first execution module, when the first execution module is in a running procedure, wherein the third execution module is an original invoked module of the first execution module.

Optionally, the computer program instruction stored in the storage medium, when being executed, further makes the electronic device perform the following step.

It is determined whether the first network connection is the safe connection or not to obtain a determination result, by the second execution module.

The first network connection is fed back by the second execution module, when the determination result indicates that the first network connection is the safe connection, wherein the first network connection is the second network connection at this time.

A third network connection is acquired and fed back by the second execution module when the determination result indicates that the first network connection is not the safe connection, wherein the third network connection is the safe connection, the first network connection and the third network connection correspond to the same content, and the third network connection is the second network connection at this time.

Optionally, the computer program instruction stored in the storage medium, when being executed, further makes the electronic device perform the following step.

Prompt information is generated and output by the second execution module when the determination result indicates that the first network connection is not the safe connection, after determining whether the first network connection is the safe connection or not to obtain a determination result by the second execution module, the prompt information indicating that the first network connection is not the safe connection.

Although some embodiments of the present disclosure have been described above, those skilled in the art may make additional alternations and modifications to the embodiments once being taught about the basic inventive concept. Therefore, the appended claims are intended to be construed to comprise the embodiments and all the alternations and modifications which fall within the scope of the present disclosure.

Apparently, those skilled in the art may make various modifications and variations to the present disclosure without departing from the scope and the spirit of the present disclosure. Thus, the modifications and variations of the present disclosure belong to the scope of the claims as well as the equivalents of the present disclosure, and the present disclosure intends to incorporate these modifications and variations.

The invention claimed is:

1. An information processing method applied to an electronic device capable of running an application, the method comprising:

inserting a first execution module into a target process corresponding to the application for triggering a detection for network connection safety;

the first execution module acquiring a first network connection from the target process;

the first execution module invoking a second execution module;

the second execution module validating safety of the first network connection and feeding back a second network connection, wherein the second network connection is a safe connection corresponding to the same content as the first network connection; and the target process acquiring the second network connection.

2. The method of claim 1 further comprising:

storing a running state of the target process in a register of the electronic device, before inserting the first execution module into the target process; and the target process reading out the running state from the register after acquiring the second network connection.

3. The method of claim 1 further comprising setting the second execution module before the first execution module acquiring the first network connection from the target process, so that the second execution module operatively responding to the invoking of the first execution module by replacing a third execution module, wherein the third execution module is an original invoked module of the first execution module.

4. The method of claim 1, wherein the second execution module validating the safety of the first network connection and feeding back the second network connection comprises:

determining whether the first network connection is a safe connection and obtaining a determination result;

feeding back the first network connection to act as the second network connection, if the determination result indicates that the first network connection is a safe connection; and feeding back a third network connection to act as the second network connection, if the determination result indicates that the first network connection is not a safe connection, wherein the third network connection is a safe connection corresponding to the same content as the first network connection.

5. The method of claim 4 further comprising generating and outputting prompt information by the second execution module, if the determination result indicates that the first network connection is not a safe connection, wherein the prompt information indicates that the first network connection is not safe.

6. A non-transitory computer readable storage medium having stored therein computer program instructions which, when being executed by a processor of an electronic device, performs the method of claim 1.

7. An electronic device capable of running an application, comprising:

an inserting module operative to insert a first execution module into a target process corresponding to the application, for triggering a detection for network connection safety;

the first execution module being operative to acquire a first network connection from the target process, and to invoke a second execution module;

the second execution module being operative to validate safety of the first network connection and to feed back a second network connection, wherein the second network connection is a safe connection corresponding to the same content as the first network connection; and a process management module operative to control the target process to acquire the second network connection.

8. The electronic device of claim 7 further comprising:
a register;
a storage module operative to store a running state of the target process in the register; and
wherein the process management module is further operative to control the target process to read out the running state from the register after acquiring the second network connection.

9. The electronic device of claim 7 further comprising a setting module operative to set the second execution module before the first execution module acquiring the first network connection from the target process, and to control the second execution module to respond to the invoking of the first execution module by replacing a third execution module, wherein the third execution module is an original invoked module of the first execution module.

10. The electronic device of claim 7, wherein the second execution module is further operative to:

determine whether the first network connection is a safe connection and obtain a determination result;

feed back the first network connection to act as the second network connection, if the determination result indicates that the first network connection is a safe connection, and feed back a third network connection to act as the second network connection, if the determination result indicates that the first network connection is not a safe connection, wherein the third network connection is a safe connection corresponding to the same content as the first network connection.

11. The electronic device of claim 10, wherein the second execution module is further operative to generate and output prompt information if the determination result indicates that the first network connection is not a safe connection, the prompt information indicating that the first network connection is not safe.

* * * * *